Sept. 20, 1932.   G. A. BURNHAM   1,878,107
SWITCH HOUSE AND SWITCHING SYSTEM AND APPARATUS
Filed March 12, 1928   3 Sheets-Sheet 1
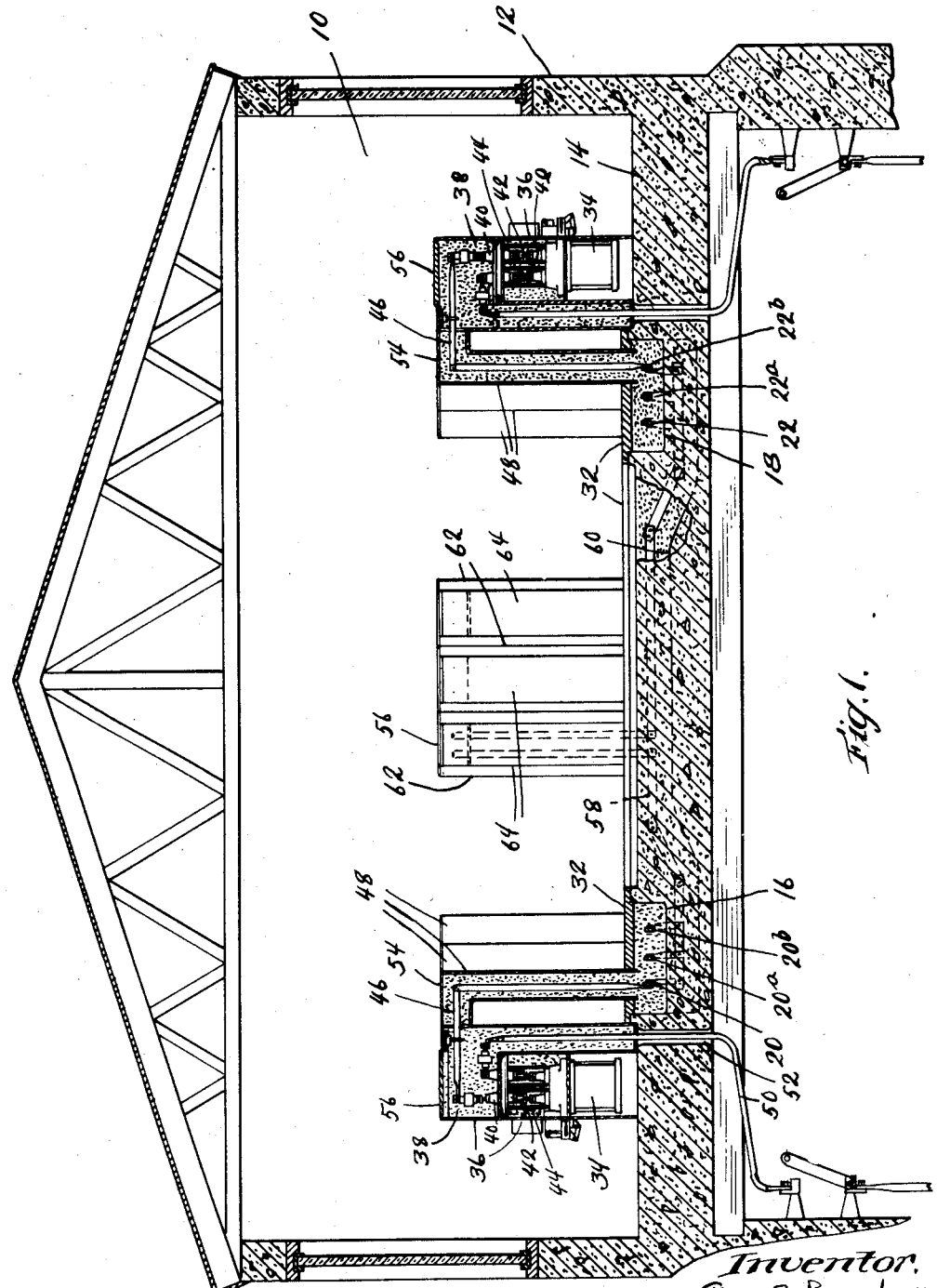

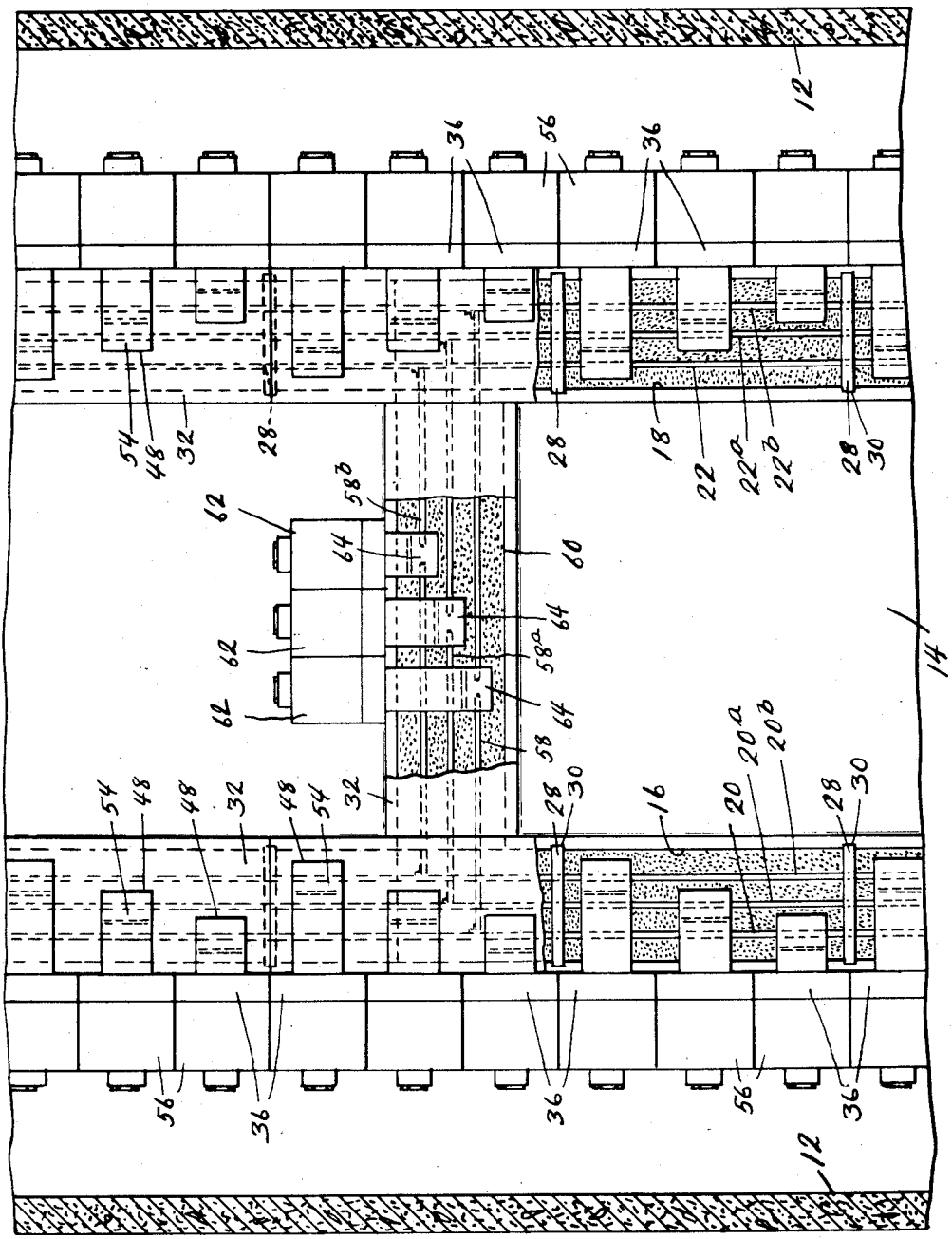

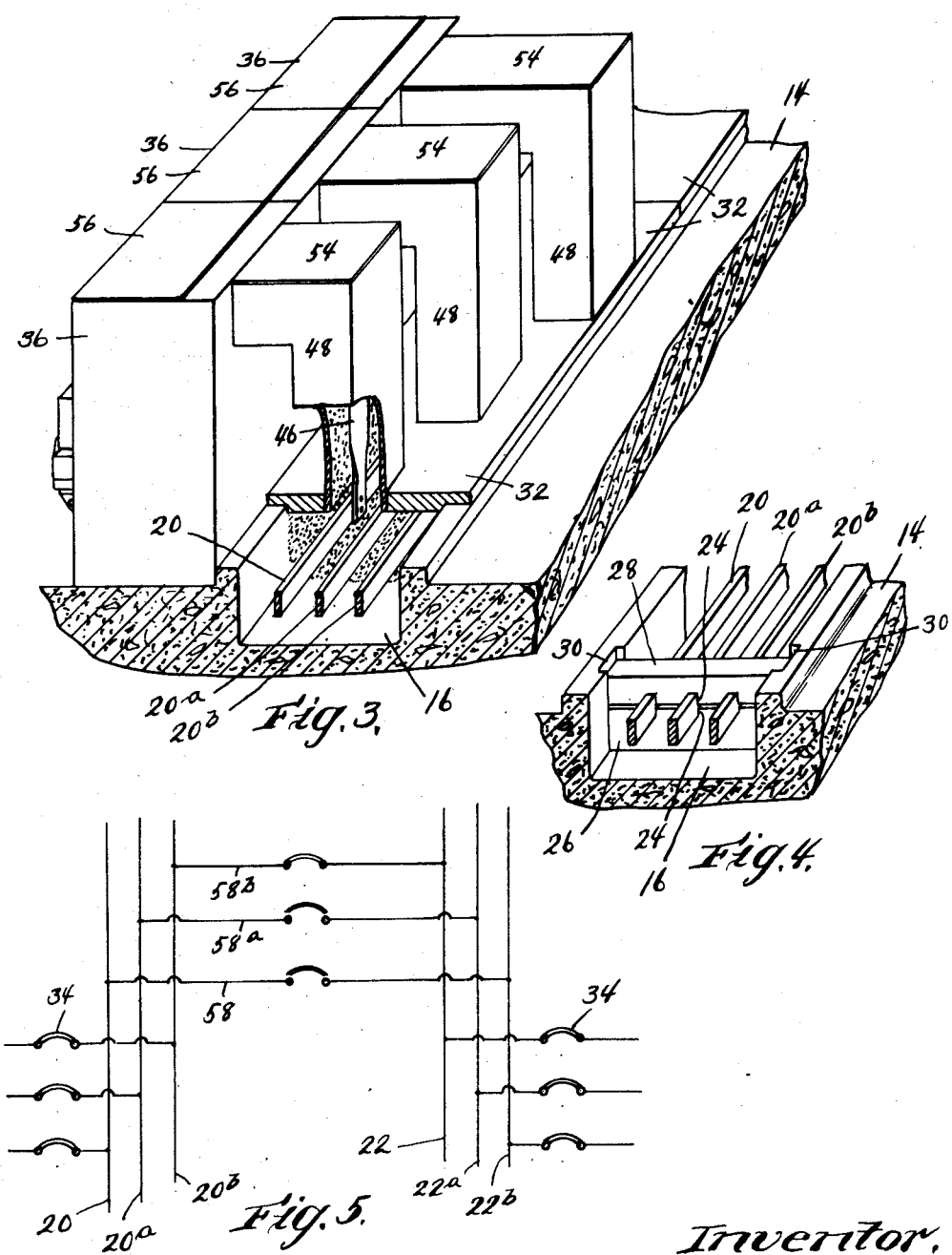

Patented Sept. 20, 1932

1,878,107

UNITED STATES PATENT OFFICE

GEORGE A. BURNHAM, OF SAUGUS, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

SWITCH HOUSE AND SWITCHING SYSTEM AND APPARATUS

Application filed March 12, 1928. Serial No. 260,843.

This invention relates to multi-phase electric switching apparatus and systems and switch houses containing the switching apparatus of the system.

In multi-phase high tension switching systems, it is essential to isolate the phase conductors from each other to prevent a disturbance, as a flash over arc, on one phase conductor from being communicated to other phases and the conductors thereof and thus break down the system.

Heretofore several methods of isolating the phases and the conductors thereof have been proposed. In accordance with one arrangement each phase conductor is placed in a separate room and, usually, on a separate floor of the switch house. This arrangement requires an expensive and elaborate lay out of the switching apparatus and the conductors. In accordance with another arrangement, the phase conductors are grouped together in a metal conduit and are insulated from each other and the conduit either by oil or by a hard insulating compound. The connections between the phase conductors and the switches are made through similar metal enclosed conductors. With this system, leakage of oil, or the fracture of the solid insulating compound, results in the formation of a disastrous arc between the phase conductors and the casings and shuts down the system. The oil and the solid insulating compound is highly inflammable and can generate large volumes of explosive gases when subjected to the arc and thus can do great damage. The apparatus moreover must be especially designed to meet different requirements and is not particularly flexible, to permit enlargement of the switching system or the subsequent substitution of larger or more efficient switching apparatus. By reason of the peculiar construction of the apparatus, the system is limited to moderate voltages.

It is an object of the present invention to provide a switch house and an arrangement of the switching apparatus therein which permits the grouping of the various phase conductors and at the same time provides complete isolation between the conductors and also permits the use of, in the main, standard apparatus and which also is flexible in that the system is adapted for changes of voltages, for expansion by the addition of additional switches, and by the substitution for the original switches of larger or more improved apparatus that may subsequently be developed or found necessary.

In accordance with this invention and as an additional object thereof, the phase conductors, instead of being located in separate stories of a switch house, or located in an oil or compound filled metal casing carried above the switches, are located all in one room of the switch house in trenches formed in a wall, as the floor of the switch house. The phase conductors are supported in spaced relation from each other and from the walls of the trenches by suitable insulating supports and are insulated from each other preferably by air and are isolated from each other against gaseous intercommunication by being imbedded in a mobile body of loose solid inert non-combustible insulating particles, as a body of sand.

The switches are located in cells or closed compartments adjacent the trenches and the conductors leading from the phase conductors to the switches are also enclosed in a similar mobile body. The mobile body prevents any hot and conducting gases from coming in contact with a phase conductor and thus prevents the initiation of a break down arc. The mobile body also acts as an effective barrier to prevent conducting particles from forming a bridge between a phase conductor and some body at a lower potential.

In one preferred form of switching system the main and auxiliary buses of the system are located in parallel trenches in the same floor of the switch room and the switches associated with the buses stand upon the floor beside the trenches and the main and auxiliary buses are tied in by tie-conductors running through a transversely located trench which communicates with the main and auxiliary trenches and the tie-conductors pass through bus tie switches; and all of the trenches are filled with sand and the conductors are imbedded in and isolated by the sand. Such a system constitutes another object of the invention.

A further object of the invention is generally to improve the construction of switch houses and switching systems and apparatus thereof.

Fig. 1 is a sectional elevation through a switch house embodying the present invention.

Fig. 2 is a plan view of the apparatus of Fig. 1.

Fig. 3 is a perspective detail partly in section of one of the bus trenches and some of the switches associated therewith.

Fig. 4 is a perspective detail illustrating the manner of supporting the bus conductors in a trench.

Fig. 5 is a diagram of the connections between the main and auxiliary buses and the switches associated with the buses.

As here shown the switching apparatus of the switch house may be located in the upper room 10, composed of the side walls 12, and the floor 14. Following the usual construction, the floor 14 preferably is composed of concrete, as may be the side walls 12 also.

In accordance with this invention, a pair of parallel trenches 16 and 18 are formed in the floor and are made preferably at the time the floor is poured. The trench 16 is occupied by three main phase conductors or buses 20, 20a, 20b and the trench 18 is occupied by three auxiliary phase conductors or buses 22, 22a, 22b. The phase conductors are disposed within the trenches in spaced parallel horizontal order. The depth and breadth of the trenches are such as to provide suitable spacing between the phase conductors and between the conductors and the walls of the trench for the proper insulation of the conductors with air as the insulating dielectric.

The buses are supported in spaced relation by being received in opposed notches 24, see Fig. 4, of complementary porcelain cleats 26 and 28 which are received loosely in opposed vertical grooves 30 formed in the opposite side walls of the trenches.

The open tops of the trenches are closed by suitable covers 32.

The trenches are filled and the bus conductors are embedded in a mobile body of loose solid insulating non-combustible particles, as a body of sand, of which more will be said later.

The switches 34 associated with the buses are contained within sheet steel housings 36 which are disposed in rows on the floor 14 in line with and on opposite sides of the bus trenches. The switch compartments are separate from the upper and rear conductor compartments 38 of the housings and connection is made between the conductor compartments and the switch compartments through insulating bushings 40. The switches are of the type which are adapted to be raised and lowered to make connection between said bushings 40 and the terminals of the switch and the exposed terminals 42 of the bushings and the switches are enclosed within the insulating tubes 44 which also are filled with sand, thereby to prevent gaseous communication between the terminals and the surrounding atmosphere. The particular construction is illustrated and claimed in my copending application Serial No. 243,902, filed December 31, 1927.

Connection is made between each of the switches and a separate one of the buses by a conductor 46 which conductor is extended from one of the buses as the bus 20 into the upper conductor compartment 38 of the housing 36 and is connected with one of the bushings 40 therein and is extended through a sheet metal conduit 48 that is in communication with both said trench and with the conductor compartment 38. Said conduit 48 preferably extends into a passage through the trench cover 32, which passage is located above the selected bus. The spacing between the conductor 46 and the conduit 48 and housing 36 is such as to prevent flash over with air as the insulating dielectric. The other bushing 40 of the switch housing is connected preferably with a metallic sheathed insulated cable 50 which extends downwardly within the rear portion of the conductor compartment 38 and through a passage 52 in the floor 14 and into the lower story of the switch house where it may pass to any desired location. The conduit 48 and the conductor compartment 38 of the switch housing are also filled with sand to isolate completely the conductor 46 and the exposed conductors in the conductor compartment 38 from gaseous intercommunication. The duct 48 is provided with a removable cover 54 and the conductor compartment is provided with a removable cover 56 by which both the conduit and compartment can be filled readily with sand.

The main and auxiliary buses in the trenches 16 and 18 are tied together by tie-conductors 58, 58a, 58b which are located in a trench 60 that extends between and is in communication with both of said trenches 16 and 18. The bus tie conductors are located in said connecting trench 60 and are supported therein in the manner described in connection with the main and auxiliary buses. The trench 60 is also filled with sand or equivalent isolating body. Bus-tie-switches contained in the housings 62, which may be similar in construction to the switches 34 and the housings 36, are located alongside the trench 60 and are included in series with said bus tie-conductors. Said conductors extend upwardly within the sheet metal conduits 64 to the switches in a similar manner to that described in connection with the conduit 48; and these conduits 64 also are filled with sand.

The arrangement above described is merely illustrative of one type of switching system embodying the present invention.

With the arrangement above set forth the phase conductors are completely isolated from each other and from grounded objects by the body of sand. Trouble on one conductor can not be communicated to another conductor or to ground by a conducting gas because the body of sand prevents the gas from reaching the conductor and cools it so that it is non-conducting. The sand body is mobile so that it can flow into position around the conductors and prevent the presence of large voids. The sand is an excellent insulator although the insulating properties of the sand are not herein utilized to reduce the spacing between the conductors and the grounded objects. The sand is non-combustible and so will not burn if an arc should form therein. It does not give off combustible gases or create dangerous pressures or decompose to form a permanent conductor when subjected to an arc as is the case with oil. The sand body is mobile so that it is free to change its shape and dimensions due to expansion and contraction of the trenches or conduits and the conductors without forming voids of reduced insulating capacity, as is the case of a solid dielectric. It will not escape through small openings. If an arc should occur within the body of sand, the sand fuses and forms a solid insulating rod or mass which is of much higher dielectric strength than the loose sand body so that after the arc has passed, the isolating body, at the vicinity of the arc, has greatly increased dielectric strength. Sand will flow into the space vacated by the particles forming the rod and thus the body will be resealed automatically and immediately.

The size of the sand particles is not particularly important. Particles ½ mm. thick are satisfactory. A clean quartz sand, relatively free from conducting metallic compounds and foreign matter is preferred.

The present arrangement is particularly desirable in that the switches and the housing herein shown are at present standard commercial pieces of apparatus so that all of the advantages of the sand isolated conductors can be utilized at little expense as contrasted with previously known arrangements. The lay out of the conductors in the switches is exceedingly simple and is symmetrical so that the installation of the system within the station is facilitated, and the work can be done largely by unskilled and low priced laborers.

Other arrangements wherein a mobile body of loose solid insulating particles is utilized to isolate electric conductors and the broader claims of the application of such a body to electric conductors are contained in my Patent No. 1,748,060.

I claim:

1. A switch house having a floor that is provided with a trench, an electric conductor in said trench and embedded in a mobile body of loose solid non-combustible insulating particles, and an electrical apparatus carried by the floor mainly above said trench and connected with said conductor.

2. A switch house having a floor that is provided with a trench, an electric conductor in said trench and embedded in a mobile body of loose solid non-combustible insulating particles, and an electrical apparatus, carried by the floor mainly above said trench and having a connection with said conductor which also is embedded in a similar mobile body.

3. A high tension switch house having a floor that is provided with a trench, a mobile body of loose solid non-combustible insulating particles occupying said trench, a plurality of spaced phase conductors located in said trench and embedded in said mobile body, and switch apparatus carried by the floor mainly above said trench having depending connections with said phase conductors.

4. A high tension switch house having a floor that is provided with a trench, a mobile body of loose solid non-combustible insulating particles occupying said trench, a plurality of spaced phase conductors located in said trench and embedded in said mobile body, and switch apparatus carried by the floor mainly above said trench and having depending conductors that also are embedded in similar mobile bodies and are connected with said phase conductors.

5. A high tension switch house having a floor provided with a trench, a mobile body of loose solid non-conducting particles occupying said trench, a high tension bus also occupying said trench and embedded in said mobile body, a conduit in communication with said trench and containing a similar mobile body, a conductor embedded in the mobile body in said conduit and connected with said bus, and an electric switch connected with said conductor.

6. A high tension switch house having a trench formed in a floor thereof, a mobile body of loose solid non-combustible insulating particles occupying said trench, a high tension bus contained in said trench and embedded in said mobile body, a switch housing supported on said floor at one side of and above and overlying said trench and containing a similar mobile body which is continuous with the mobile body in said trench, a conductor embedded in the mobile body of said housing and connected with said bus, and a switch contained within said housing and connected with said conductor.

7. A high tension switch house having a trench formed in the floor thereof, a mobile body of loose solid non-conducting insulating particles occupying said trench, a bus embedded in said mobile body, a cover for said trench having an opening therethrough, a switch housing carried by said floor at one side of and upstanding above said trench, a conduit connected with said switch housing at one end, and aligned with said cover opening at the other end, a similar mobile body occupying said conduit and being continuous with the mobile body in said trench, a conductor located in said conduit and embedded in the mobile body therein and connected with said bus, and a switch in said housing connected with the conductor therein.

8. A high tension switch house having a pair of parallel trenches formed in the floor thereof and another trench which is in communication with both of said parallel trenches and all of said trenches being occupied by mobile bodies of loose solid non-combustible insulating particles, high tension buses located in said parallel trenches and embedded in the mobile bodies therein, a tie-in bus located in said communicating trench and embedded in the mobile body therein and connected with the aforesaid buses, and an electric switch included in the circuit of said tie-in bus.

9. A high tension switch house having a pair of parallel trenches formed in the floor thereof and another trench which is in communication with both of said parallel trenches and all of said trenches being occupied by mobile bodies of loose solid non-combustible insulating particles, high tension buses located in said parallel trenches and embedded in the mobile bodies therein, a tie-in bus located in said communicating trench and embedded in the mobile body therein and connected with the aforesaid buses, an electric switch included in the circuit of said tie-in bus having conductors extended between said switch and said tie-in bus, and conduits enclosing said conductors containing similar mobile bodies in which said conductors are embedded.

10. A high tension switch house having a trench located in a wall thereof, a mobile body of loose solid non-conducting insulating particles contained in said trench, a bus located in said trench and embedded in said mobile body, an electric switch associated with said bus, a conduit extended from the terminals of said switch to said trench and containing a similar mobile body, a conductor embedded in the mobile body of said conduit and connected with said bus and with one terminal of said switch, and a metal sheathed insulated cable connected with the other terminal of said switch and extended out of said conduit.

11. In a switch house, the combination of a wall having a conductor-trench therein which is formed with opposed grooves in the opposite walls thereof, complementary notched insulating cleats received in said grooves, and a conductor received in the notches of said cleats.

12. A switch house including a single room having side walls and a floor, said floor having parallel gutters formed therein, a plurality of different phase conductors disposed in one gutter and constituting the main bus conductors of the switch house, a plurality of conductors of different phases disposed in said other gutter and constituting the auxiliary bus conductors for the switch house, a transverse gutter in said floor connecting said parallel gutters, separate phase conductors disposed therein and connected with the separate phase conductors of said parallel gutters, covers for said gutters having apertures therein, vertical ducts forming closures for said apertures, said vertical ducts communicating at their upper ends with terminal compartments having the upper line terminals of electric switches disposed therein, conductors extended from said compartments through said vertical ducts and connecting said switch terminals with certain selected conductors of said buses, and a mobile body of discrete non-combustible insulating material occupying said gutters, ducts, and compartments and mechanically isolating said phase conductors from each other and ground.

13. The combination of a switch house having a room provided with a floor having parallel gutters extended along opposite sides of the floor, a plurality of different phase conductors located in spaced and insulated relation in said gutters, a mobile body of non-combustible insulating particles occupying said gutters and mechanically isolating the conductors, switch cells upstanding above said floor and extended in line with and at the side of said gutters, said cells having conductor compartments which open into said gutters over certain of the conductors therein, conductors in said compartments connected with said phase conductors, a similar mobile body of non-combustible insulating particles therein providing mechanical isolation for the conductors, and switches in said cells.

14. The combination of a switch house including a floor having parallel gutters extended along opposite sides thereof, a plurality of different phase conductors of main and auxiliary buses located in spaced relation in said gutters, a transverse gutter connecting said parallel gutters, conductors disposed in spaced and insulated relation therein and separately connecting the similar phase conductors of said main and auxiliary buses, a mobile body of non-combustible insulating particles occupying said gutters and mechanically isolating the several phase conductors therein from each other and from the enclosing walls of said gutters, switch cells upstanding above said floor and arranged alongside said gutters at one side thereof, said switch cells having terminal compartments which are in communication with said gutters over certain of the bus conductors therein, switches having terminals disposed in said cells, conductors separately connecting certain of said switch terminals with the phase conductors of the adjacent gutters, a similar mobile body of non-combustible insulating particles disposed therein providing mechanical isolation for said conductors, and covers providing a closure for said gutters about said switch cells, all of said apparatus being located in a single room of said switch house and spaced so as to permit free access thereto.

15. In a switch house, the combination of a floor having formed therein spaced parallel gutters and a transverse gutter connecting said parallel gutters, covers for said gutters having openings into said gutters, compartments arranged alongside said gutters having electric switches therein, the terminals of which are disposed in the upper portion of said compartment, ducts extended from said switch compartments to said gutters and overlying and enclosing the openings in the covers thereof, different phase conductors of high tension buses disposed within said gutters and spaced apart from the walls thereof and from each other, conductors disposed within said ducts separately connecting the conductors of said bus with certain terminals of said switches, and means comprising a loose mobile body of discrete particles of insulating material disposed within said ducts, gutters and terminal compartments and mechanically isolating the electrically conducting parts therein, all of said apparatus being disposed in a single room of said switch house.

16. In a switch house, the combination of a floor having parallel gutters and a transverse gutter connecting said parallel gutters, phase conductors of a main bus disposed in one of said parallel gutters and spaced apart from the side walls thereof and from each other, phase conductors of an auxiliary bus similarly disposed in said other parallel gutter, bus tie conductors disposed in said transverse gutter and separately connecting the different phase conductors in said parallel gutters, covers for said gutters having apertures therein, upstanding ducts disposed over and forming a closure for said apertures, switch compartments disposed alongside said gutters having terminal compartments therein for the exposed live terminals of said switches, means connecting said terminal compartments with the upper extended ends of said ducts, conductors extended through said ducts and connecting said switch terminals separately with the different phase conductors in said gutters, and a mobile body of insulating conductor-supporting material disposed in said compartments, ducts and gutters surrounding and isolating said conductors from each other and from the enclosing structure therefor, all of said apparatus being disposed in a single room of said switch house and spaced apart to permit ready access thereto.

17. In a switch house, the combination of a floor having parallel gutters and a transverse gutter connecting said parallel gutters, phase conductors of a main bus disposed in one of said parallel gutters and spaced apart from the side walls thereof and from each other, phase conductors of an auxiliary bus similarly disposed in said other parallel gutter, bus tie conductors disposed in said transverse gutter and separately connecting the different phase conductors in said parallel gutters, covers for said gutters having apertures therein, upstanding ducts disposed over and forming a closure for said apertures, switch compartments disposed alongside said gutters having terminal compartments therein for the exposed live terminals of said switches, means connecting said terminal compartments with the upper extended ends of said ducts, conductors extended through said ducts and connecting said switch terminals separately with the different phase conductors in said gutters, openings in said floor beneath said terminal compartments, upstanding ducts enclosing said openings and communicating with said terminal compartments at their upper ends, distribution conductors extended through said floor and ducts and connected with the outgoing terminals of said switches, and a body of mobile insulating material composed of loose discrete particles disposed within said terminal compartment, ducts and gutters and mechanically isolating said different phase conductors from each other and from the adjacent walls of said enclosures, all of said apparatus being contained in a single room of said switch house.

In testimony whereof, I have signed my name to this specification.

GEORGE A. BURNHAM.